US012793381B2

(12) United States Patent
Masters

(10) Patent No.: US 12,793,381 B2
(45) Date of Patent: Nov. 10, 2026

(54) METHOD AND SYSTEM FOR IDENTIFYING DIFFRACTION SPOTS IN AN ELECTRON DIFFRACTION PATTERN

(71) Applicant: Oxford Instruments Nanotechnology Tools Limited, High Wycombe (GB)

(72) Inventor: Robert Masters, Abingdon (GB)

(73) Assignee: Oxford Instruments Nanotechnology Tools Limited, High Wycombe (GB)

( * ) Notice: Subject to any disclaimer, the term of this patent is extended or adjusted under 35 U.S.C. 154(b) by 205 days.

(21) Appl. No.: 18/904,761

(22) Filed: Oct. 2, 2024

(65) Prior Publication Data

US 2026/0094408 A1 Apr. 2, 2026

(51) Int. Cl.

*G06T 5/00* (2024.01)
*G06T 5/10* (2006.01)
*G06T 5/20* (2006.01)
*G06T 5/50* (2006.01)
*G06T 5/70* (2024.01)
*G06V 10/60* (2022.01)

(52) U.S. Cl.

CPC ................ *G06V 10/60* (2022.01); *G06T 5/10* (2013.01); *G06T 5/20* (2013.01); *G06T 5/50* (2013.01); *G06T 5/70* (2024.01); *G06T 2207/20216* (2013.01)

(58) Field of Classification Search

CPC .. G06V 10/60; G06T 5/10; G06T 5/20; G06T 5/50; G06T 5/70; G06T 2207/20216
See application file for complete search history.

(56) References Cited

U.S. PATENT DOCUMENTS

| | | | | |
|---|---|---|---|---|
| 12,085,520 | B2 * | 9/2024 | Kapteyn | G01N 23/20 |
| 2006/0067470 | A1 * | 3/2006 | Wang | G01N 23/2076 378/73 |
| 2023/0351559 | A1 * | 11/2023 | Spielman | G06T 5/50 |
| 2024/0005457 | A1 * | 1/2024 | Lei | G06T 5/50 |

FOREIGN PATENT DOCUMENTS

| | | | | | |
|---|---|---|---|---|---|
| CN | 109507219 | A * | 3/2019 | G01N 23/20075 |
| CN | 114609167 | A * | 6/2022 | G01N 23/20058 |
| EP | 3399498 | A1 * | 11/2018 | G06T 5/50 |
| WO | WO-2019200248 | A1 * | 10/2019 | H04N 19/90 |

OTHER PUBLICATIONS

Barty A. et al., Cheetah: software for high-throughput reduction and analysis of serial femtosecond X-ray diffraction data, J. Applied Crystallography, (2014) 47, May 29, pp. 1118-1131, doi:10.1107/S1600576714007626.

* cited by examiner

*Primary Examiner* — Ping Y Hsieh
(74) *Attorney, Agent, or Firm* — BLANK ROME LLP

(57) ABSTRACT

A method for detecting diffraction spots in an electron diffraction pattern obtained from a sample, the method comprising the steps: obtaining a first image of the sample, the first image comprising the electron diffraction pattern; obtaining a second image representing a background signal intensity distribution of the first image; defining, for the second image, a plurality of second pixel sets by assigning one or more pixels of the second image to a respective second pixel set based on a pixel value of the pixel, wherein each second pixel set spans a respective pixel value range; and identifying, using first pixel sets in the first image corresponding to respective second pixel sets, any outlier pixels in the first image as being pixels associated with diffraction spots.

20 Claims, 6 Drawing Sheets

METHOD AND SYSTEM FOR IDENTIFYING DIFFRACTION SPOTS IN AN ELECTRON DIFFRACTION PATTERN

FIELD OF THE INVENTION

The present invention relates to a method and system for identifying diffraction spots in an electron diffraction pattern.

BACKGROUND

Electron backscatter diffraction (EBSD) is a widely utilized technique in materials science for characterizing the crystallographic structure of materials. Recently, the use of transmission Kikuchi diffraction (TKD) detectors has gained popularity due to their ability to analyze with higher spatial resolution due to the use of thin samples.

However, issues arise from the presence of diffraction spots within TKD patterns. Pixels associated with these diffraction spots typically produce significantly higher pixel intensity than surrounding pixels. Consequently, when performing band detection using the Hough transform, peaks corresponding to these high-intensity diffraction spots are detected in the Hough space. These diffraction spot peaks, however, do not represent actual Kikuchi bands but may result in their erroneous interpretation.

The erroneous detection of diffraction spots as Kikuchi bands can lead to substantial errors in the analysis of the TKD pattern. In severe cases, these errors may prevent successful analysis of the diffraction pattern altogether. This poses a critical challenge, as accurate band detection is essential for reliable EBSD analysis and subsequent material characterization (e.g., crystallographic structure and orientation determination).

Therefore, there exists a need for a method to detect these diffraction spots from TKD analysis to prevent them from interfering with the detection of actual Kikuchi bands.

SUMMARY OF INVENTION

In accordance with a first aspect of the invention, there is provided a method for detecting diffraction spots in an electron diffraction pattern obtained from a sample, the method comprising the steps: obtaining a first image of the sample, the first image comprising the electron diffraction pattern; obtaining a second image representing a background signal intensity distribution of the first image; obtaining, from the second image, a plurality of second pixel sets by assigning one or more pixels of the second image to a second pixel set based on a pixel value of the pixel, wherein each second pixel set spans a respective pixel value range; and identifying, using first pixel sets in the first image corresponding to respective second pixel sets, any outlier pixels in the first image as being pixels associated with diffraction spots.

The "electron diffraction pattern" may be understood as a series of features formed when a beam of electrons scatters or interacts with atoms in the sample. The electron diffraction pattern could comprise a transmission Kikuchi diffraction (TKD) pattern and/or one or more diffraction spots. The first image comprises a plurality of pixels comprising the electron diffraction pattern.

The sample may be an electron transparent sample. An "electron transparent sample" may be understood as a sample thin enough that most primary beam electrons pass through the sample without interaction. For example, the electron transparent sample has a thickness of around 100 nm.

The "background signal intensity distribution" may be understood as a distribution of pixel intensities across the first image caused by signals other than the TKD pattern and/or the diffraction spots. For example, because of electrons that interact with the sample without producing diffraction effects.

The "second pixel sets" may be understood as groups or sets of pixels of the second image that have equal or similar background pixel intensity values. For example, each pixel in a particular second pixel set may have a pixel intensity within boundary values used in defining the second pixel set (and so a bounding value may be thought of as a threshold value). In some embodiments, the threshold intensity is used in defining the set, but alternatively it results from the sets being formed otherwise. Therefore, the second pixel sets may be thought of as groups of similar pixels (i.e., similar background intensities). The second image typically comprises a gradual variation of pixel intensities across the second image and as such, each second pixel set is typically in the form of a contour of pixels. The step of defining the plurality of second pixel sets may be thought of as obtaining a plurality of second pixel sets from the second image.

The phrase "each second pixel set spans a respective pixel value range" may be understood as each second pixel set including pixels that have pixel values distributed across the pixel value range. Each second pixel set will have a greatest pixel intensity value and a smallest pixel intensity value. It will be appreciated that in some situations the greatest pixel intensity may be equal to the smallest pixel intensity. For example, each pixel of a second pixel set may have the same pixel grey value.

The "first pixel set" may be understood as groups or sets of pixels of the first image that are equivalent to or correspond to sets of pixels in the second image. For example, the pixel in an "equivalent" or "corresponding" pixel location may be understood as a pixel in the first image that corresponds to the same detector element or location as the pixel in the second image.

The "pixel value" may refer to a value indicative of an intensity recorded by that pixel on an associated detector. For example, the pixel value may represent the number of electrons incident upon that pixel of the detector over an exposure time.

It will be understood that the second image and the first image are typically of the same size and as such, the pixels of the second image have corresponding pixels in the first image. In other words, there may be pixels in the second image that have the same pixel location as pixels in the first image. Therefore, pixels in the second pixel sets of the second image typically have corresponding pixels in the first image. These corresponding pixels in the first image are typically the pixels of the first pixel set corresponding to the second pixel set.

The feature "identifying, using first pixel sets in the first image corresponding to respective second pixel sets, any outlier pixels in the first image, as being pixels associated with diffraction spots" may be understood as identifying zero or more outlier pixels. It will be appreciated that in some cases, the sample may not produce any diffraction pattern or may produce only a TKD pattern on the detector (i.e., no diffraction spots). In such cases, the step of identifying any outlier pixels may not identify any outlier pixels. Alternatively, in cases wherein a diffraction pattern including diffraction spots is produced on the detector, this feature may comprise identifying, using first pixel sets in the first image corresponding to respective second pixel sets, any outlier pixels in the first image as being pixels associated with diffraction spots.

The present disclosure provides a method in which an image comprising an electron diffraction pattern is obtained from a detector. The electron diffraction pattern typically comprises a TKD pattern and one or more diffraction spots. As discussed above, the presence of these diffraction spots can lead to substantial errors in the analysis of TKD patterns. The present invention addresses this problem by obtaining a second image representing a background signal intensity distribution of the first image, obtaining a plurality of second pixel sets having a pixel intensity within a threshold intensity of the other pixels in the second pixel set, and identifying outlier pixels in corresponding first pixel sets of the first image. As discussed above, the second pixel sets may be thought of as groups of pixels capturing similar electron signal intensity and thus Poisson noise levels. The outlier pixels may be statistical outlier pixels in the first image associated with the diffraction spots. These outlier pixels can be removed such that a final image is produced having only the TKD patterns. Alternatively, these outlier pixels (i.e., detected diffraction spots) may be utilized for further analysis.

The method can be used to detect statistical outlier pixels in any image having a smooth background intensity distribution, with particular advantages for images with low symmetry or poorly understood background distributions. Advantageously, the present invention can be applied to standalone images with no prior knowledge required (for example, experiment geometry or a typical electron signal distribution). Existing methods, such as the method disclosed in Barty A, Kirian R A, Maia F R, Hantke M, Yoon C H, White T A, Chapman H. Cheetah: software for high-throughput reduction and analysis of serial femtosecond X-ray diffraction data. *J Appl Crystallogr.* 2014 May 29 typically require such prior information on geometry or electron signal distribution across the sensor.

The invention advantageously provides robust detection of diffraction spots from TKD patterns, such that these spots can be masked from the TKD analysis procedure. This enables more accurate detection of the Kikuchi diffraction features that can be analysed to determine the crystal properties of the sample.

Once diffraction spots have been detected or identified, it may be beneficial to use the diffraction spot positions for analysis of the crystal structure. As such, the core of this invention may be a method for detecting diffraction spots. The information on diffraction spot locations may then be used for a range of different purposes.

It will be understood that the said first pixel sets in or of the first image may be defined based on those defined for the second image (i.e., based on the second pixel sets). Typically, some or all the first pixel sets of the first image correspond to respective second pixel sets of the second image, for example by way of having the same or corresponding pixel locations.

In some embodiments, identifying, using first pixel sets in the first image corresponding to second pixel sets of the second image, any outlier pixels in the first image comprises: identifying, from pixels of a first pixel set, any pixels that meet a threshold condition of that first pixel set. These pixels that meet the threshold condition may be thought of as statistical outlier pixels that have recorded a signal intensity that is a threshold number of standard deviations greater than that of the pixels in the first pixel set. Since the pixels of the first pixel set have typically recorded a convolution of background signals and diffraction signals, any diffraction spots typically result in pixels recording intensities significantly greater than the intensities of the rest of the first pixel set. Advantageously, these outlier pixels can be identified without any prior knowledge, such as experiment geometry or electron signal distribution.

In some embodiments, pixel locations of the first pixel set are the same, or correspond to, pixel locations of corresponding pixels in the second pixel set. In this way, pixels of the first pixel set of the first image may be easily determined as being pixels having the same or equivalent pixel location as the pixels of the second pixel set. The pixel in an "equivalent" or "corresponding" pixel location may be understood as a pixel in the first image that corresponds to the same detector element or location as the pixel in the second image. A same or corresponding pixel location may be thought of generally as a same or corresponding position within an image. In typical embodiments wherein the first and second images may have the same pixel resolution and/or aspect ratio, a direct relationship may exist between the corresponding pixels, for example whereby a same pixel location may refer to the pixel at the same x and y coordinates in both images. In some embodiments, for example when aspect ratios differ, a same or corresponding pixel location may be defined by an indirect relationship, for instance involving a mapping or scaling between the two images.

In some embodiments, identifying, from pixels of the first pixel set, any pixels that meet a threshold condition of that first pixel set comprises: obtaining a mean pixel intensity of the first pixel set; obtaining a pixel intensity standard deviation of the first pixel set; and identifying any pixels of the first pixel set having a pixel intensity greater than a threshold factor of pixel intensity standard deviations from the mean pixel intensity. In this way, the outlier pixels may be identified as pixels having a pixel intensity that significantly differs from most of the pixels of that first pixel set. Advantageously, pixels associated with diffraction spots may be identified in a computationally inexpensive manner.

In some embodiments, the threshold factor of pixel intensity standard deviations from the mean pixel intensity is in the range of 2 to 5. In this way, the outlier pixels may be identified as pixels having a pixel intensity that deviates from the mean pixel intensity of the first pixel set by 2 to 5 standard deviations. It has been found that 2 to 5 standard deviations from the mean pixel intensity typically indicates that the pixel is associated with a diffraction spot. Advantageously, pixels associated with diffraction spots may be identified in a computationally inexpensive manner.

In some embodiments, the method further comprises the iterative steps: modifying the outlier pixels from the first image; and identifying, from the first pixel sets, any further pixels that meet a threshold condition of that first pixel set. In other words, the method may include removing or masking the outlier pixels identified and repeating the step of identifying pixels that meet the threshold condition discussed above. Removing the outlier pixels typically results in the mean pixel intensity and the pixel intensity standard deviation reducing and as such, the threshold condition can change. By repeating the step of identifying pixels that meet the threshold condition, pixels that had previously not been identified as being outlier pixels may be identified. Advantageously, more pixels associated with diffraction spots may be identified.

In some embodiments, modifying the outlier pixels from the first image comprises: removing the outlier pixels.

Advantageously, these outlier pixels may have a reduced or no impact on any subsequent analysis of the diffraction pattern. Additionally, or alternatively, modifying the outlier pixels comprises adjusting the pixel value of the outlier pixels. For example, the pixel value of the outlier pixels could be replaced with the mean pixel value. In this way, the number of data points may not be reduced.

Obtaining, from the second image the plurality of second pixel sets could comprise: grouping the pixels of the second image based on their pixel intensity values. For example, grouping the pixels of the second image based on their pixel intensity values could comprise: obtaining pixel intensity values of the pixels in the second image; sorting the pixels according to the pixel intensity values; and selecting contiguous sets of pixels based on the sorted pixel intensity values. The pixel intensity values may correspond to values produced by the detector (i.e., corresponding to the number of incident electrons on a pixel of the detector). Sorting the pixels according to the pixel intensity values could produce a table or list of pixel intensity values, and contiguous sets of pixels could be pixels that are adjacent entries in this table or list of pixel intensity values. In this way, the plurality of second pixels sets can be obtained in a computationally inexpensive manner.

In some embodiments, each second pixel set (and by extension, first pixel set), comprises the same number of pixels. A smaller number of pixels provides a better noise level consistency, but a larger number of pixels provides a greater statistical reliability. The number of pixels may be empirically determined.

Alternatively, the number of pixels of each second pixel set may vary or be configured. For example, each second pixel set comprises a number of pixels that is proportional to a background signal intensity of the corresponding area of the second image. Typically, a second pixel set comprises a greater number of pixels when comprising pixels proximate areas of lower background signal intensity. This is because more pixels may need to be analyzed in order to identify outlier pixels in low background signal intensity regions.

Alternatively, obtaining, from the second image, the plurality of second pixel sets could comprise: assigning each pixel of the second image to one or more second pixels sets such that each second pixel set comprises pixels with pixel intensities within bounding values defining the second pixel set. The threshold intensity may be user-selected or may be determined empirically. In this way, the pixels of a particular second pixel set may have substantially similar intensity values. Advantageously, the step of identifying outlier pixels may be more effective, because pixels in a particular first pixel set may have substantially similar Poisson noise levels and by extension, outlier pixels of that first pixel set may be more easily and consistently identified as having a pixel intensity level above the threshold number of standard deviations from the mean, whilst preferably keeping a constant, or substantially constant, threshold for identifying outlier pixels across all first pixel sets.

Each second pixel set spanning a respective pixel value range may be thought of each second pixel set being defined, by virtue of the pixels assigned to it, by the respective value range. In this way, each second pixel set may be simply defined by the particular intensity range. Sorting the pixels of the second image into second pixel sets may therefore be computationally inexpensive.

A pixel of the second image may be assigned to more than one second pixel set. By extension, a pixel in the first image may be assigned to more than one first pixel set. In such cases, identifying this pixel as an outlier pixel may require that the pixel is identified as an outlier pixel for a threshold number of first pixel sets. Alternatively, identifying this pixel as an outlier pixel may require that the pixel is identified as an outlier pixel only for a single first pixel set.

In some embodiments, obtaining the second image comprises: filtering the first image to modify features having a spatial frequency exceeding a threshold spatial frequency. In some embodiments, modifying the features comprises smoothing or removing the features. The threshold spatial frequency is preferably selected such that this filtering step captures features associated with TKD patterns and diffraction spots (i.e., high spatial frequency features). In this way, the second image is left with low spatial frequency features (i.e., features with a spatial frequency that is not greater than the threshold spatial frequency), resulting in a smooth or gradual background signal intensity distribution.

In some embodiments, filtering the first image comprises: applying a Savitzky-Golay filter; or applying a fast Fourier transform (FFT) filter. Applying these filters may result in an output that clearly shows the spatial frequency of different features. The spatial frequencies of features can easily be compared to the threshold spatial frequency. A mask corresponding to the threshold spatial frequency may be applied, such that only features with a spatial frequency below the threshold spatial frequency remain.

In some embodiments, obtaining the second image comprises: scanning an electron beam over an area of the sample comprising features with a number of different crystal orientations greater than or equal to a predefined minimum; obtaining, from the detector whilst scanning the electron beam, a plurality of images of the area of the sample; and obtaining an average image from the plurality of images. The threshold number of orientations is preferably such that the average image results in the features being averaged out. The features that change over time are the TKD patterns and the diffraction spots, because these are based on the orientation of the sample features. The average image may therefore capture the background signal intensity distribution, because this is typically not dependent on the orientation of the sample features. In situations where a plurality of first images is captured, this way of obtaining the second image may be less computationally expensive than applying a filter to each first image, because the same second image can be used for each iteration. In some implementations, the sample could comprise few or no crystallographic features.

In some embodiments, obtaining the second image comprises: obtaining a background image from a portion of a calibration sample that does not generate an electron diffraction pattern. In some embodiments, the calibration sample is the sample of the first aspect. Advantageously, this background image may be used as the second image for all first images of the sample and therefore the first image may not require any processing to obtain the second image.

In some embodiments, obtaining the second image comprises: modifying the crystal structure of the sample in a portion of the sample; and obtaining, from the detector, an image of the portion. For example, modifying the crystal structure of the sample in the portion comprises destroying the crystal structure in that portion. In this way, since the crystal structure at the localized portion is destroyed, the contrast of diffraction features in patterns collected from the localized portion following irradiation will be reduced substantially to zero, and only the broad background distribution will remain.

In some embodiments, the detector is an electron detector. Preferably, the electron detector is arranged to capture electrons that have transmitted through the sample and convert the energy of the captured electrons into a signal suitable for producing the first image. For example, the electron detector may comprise a phosphor screen arranged to capture the electrons, and a sensitive camera (e.g., CCD camera) arranged to capture light emitted from the phosphor screen.

In accordance with a second aspect of the invention, there is provided a system for detecting diffraction spots in an electron diffraction pattern obtained from an electron-transparent sample, the system comprising: a computer system including a central processing unit having a primary memory, wherein the system is configured when in use to perform the method of the first aspect.

The system preferably further comprises: a detector configured to receive or capture electrons transmitted through the electron-transparent sample as a result of an electron beam interacting with the sample; and generate data representing the transmitted electrons for analysis.

In accordance with a third aspect of the invention, there is provided a computer program product comprising instructions which, when the program is executed by a computer, cause the computer to carry out the method of the first aspect.

DETAILED DESCRIPTION

Figure 1A:
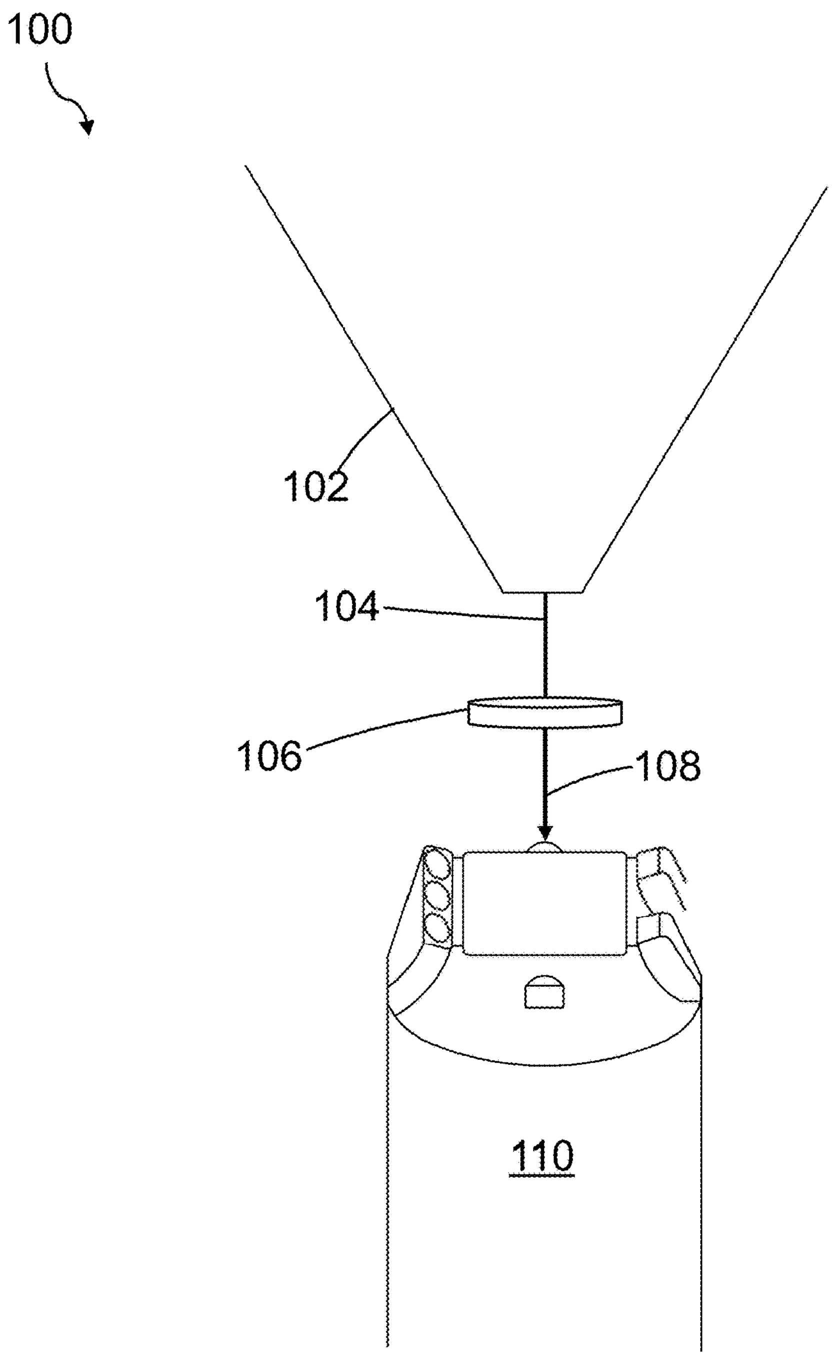
FIG. 1A is a schematic representation showing some parts of an example system that are employed in a scanning electron microscope (SEM) for analyzing a sample of material.

With reference to the accompanying drawings, FIG. 1A is a schematic representation showing some parts of an example system that are employed in a scanning electron microscope (SEM) 100 for analyzing a sample of material.

An SEM electron beam (primary electron beam) 104 is produced inside an evacuated chamber and usually focused with a combination of magnetic lenses forming the "SEM column", the final part of which, the SEM final lens pole piece 102, is shown in FIG. 1A.

The SEM 100 comprises a sample holder 106 holding an electron transparent sample. The electron transparent sample is a sample thin enough that most primary beam electrons pass through the sample without interaction. For example, the electron transparent sample has a thickness of around 100 nm. The sample holder 106 is positioned such that the SEM electron beam 104 is incident normally (or approximately normally) upon the sample.

When the focused beam 104 strikes the electron transparent sample held in a sample holder 106, some electrons are transmitted through the specimen (transmitted electrons 108) or interact with the specimen to produce secondary electrons (SE (not shown)) and a number of other emissions such as X-rays (not shown).

The SEM 100 further comprises a detector 110. The detector 110 is typically substantially similar to an electron backscatter diffraction (EBSD) detector and comprises a phosphorescent screen (not shown) and a CCD or CMOS camera (not shown). It will be appreciated that, since there are no backscattered electrons collected in the transmission geometry, the EBSD acronym is not appropriate for this device.

The detector 110 is positioned such that the detector screen is located underneath the sample, with at least some portion of the detector screen being coincident or nearly coincident with the electron beam axis of the transmitted electrons 108 so that electrons transmitted through the sample strike the detector 110. The detector 110 is configured to detect the transmitted electrons 108 and to form an image that contains a transmitted electron Kikuchi diffraction pattern or TKD pattern. Kikuchi band patterns are caused by diffraction of the emerging transmitted electrons 108. The image will also typically comprise diffraction spots formed when the incident angle of the primary electron beam 104 aligns with a crystal plane of the sample.

Figure 1B:
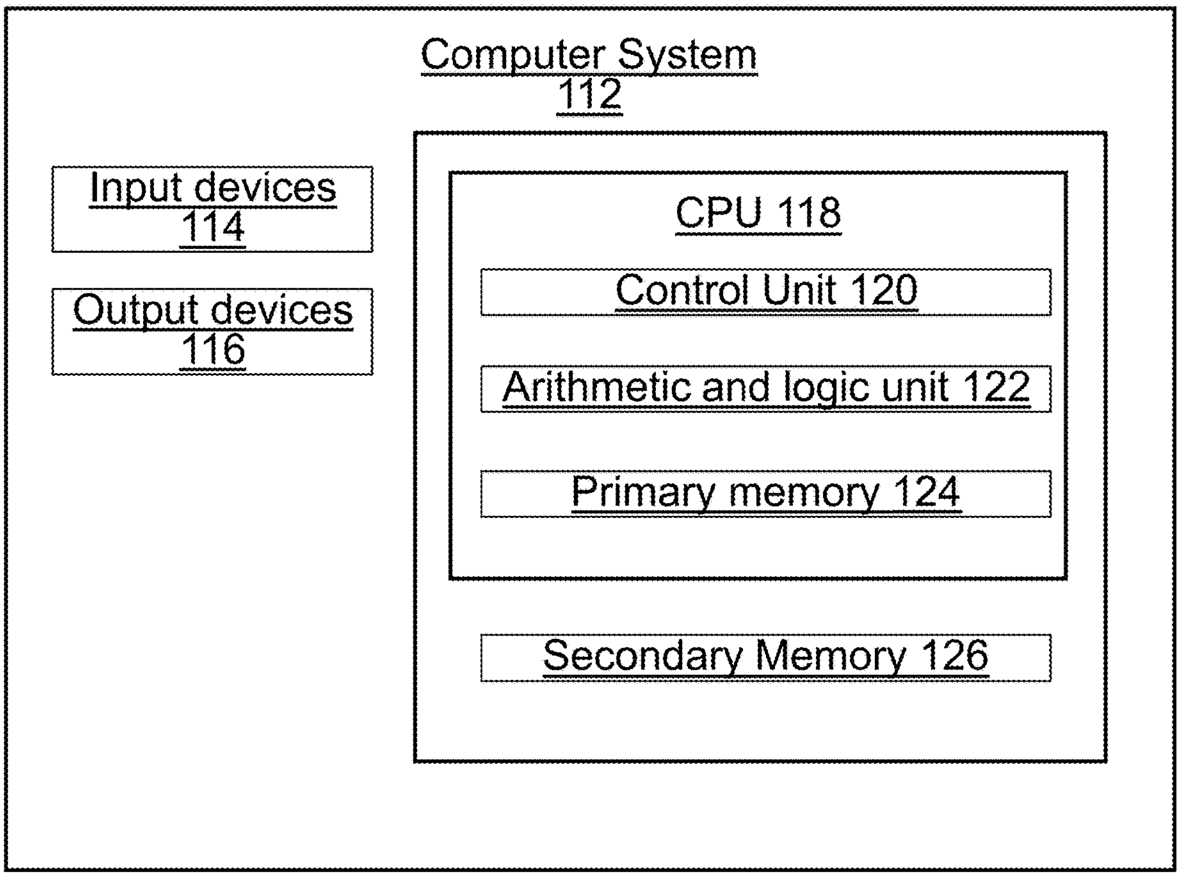
FIG. 1B shows the computer system used to operate the SEM of FIG. 1A.

The SEM 100 also includes, or is in communication with, a computer system 112, shown in FIG. 1B, which is used to operate the SEM 100, including receiving data from the detector 110. The computer system 112 takes a conventional form having input devices 114 such as a keyboard and mouse, and output devices 116 such as a display and printer. The computer system 112 has a central processing unit CPU 118. The CPU 118 includes a control unit 120 which controls the operation of the system 112 including its component parts. The CPU 118 includes an arithmetic and logic unit 122 which performs the majority of the processing underlying the method to be described. The CPU 118 also includes primary memory 124 in the form of RAM. External to the CPU 118 there is provided secondary memory 126 arranged as a solid-state hard disc which has a much larger memory capacity than the primary memory 124. The secondary memory 126 is provided as a non-volatile memory. The control unit 120 may cause data from the secondary memory 126 to be loaded into the arithmetic and logic unit 122, although in order for this to be achieved it must be firstly loaded into the primary memory 124. The secondary memory may comprise instructions which, when executed by the computer system 112, cause the computer system 112 to carry out the method as disclosed herein.

Figure 2:
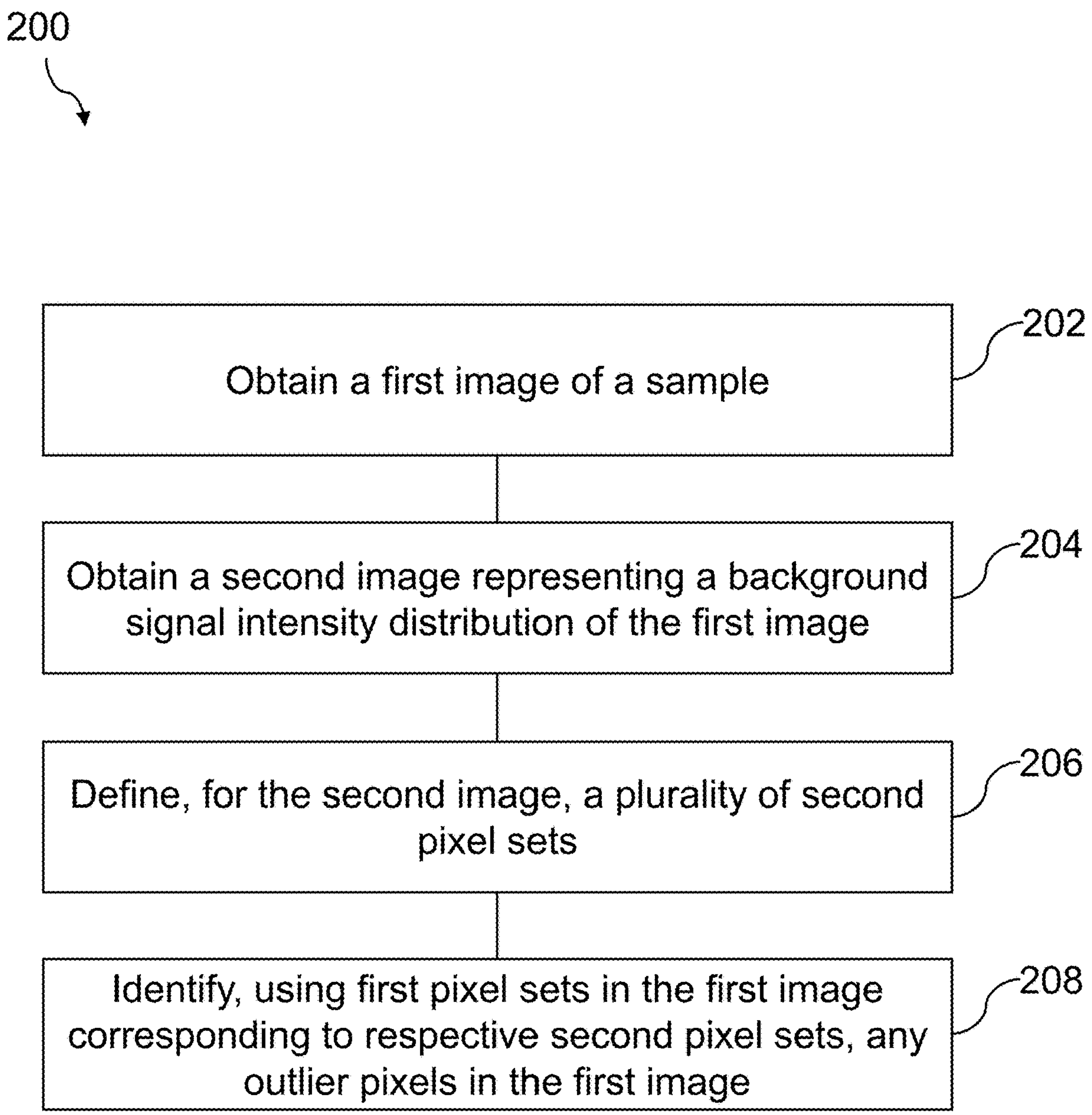
FIG. 2 illustrates a method flow diagram of a method according to the present invention.

Referring now to FIG. 2, FIG. 2 illustrates a method flow diagram of a method 200 according to the present invention. The method is for detecting diffraction spots in an electron diffraction pattern obtained from an electron-transparent sample (e.g., the sample held by the sample holder 106). More specifically, method 200 provides a diffraction spot detection method for finding diffraction spots in Kikuchi patterns acquired in transmission geometry. By detecting these diffraction spots, they can be masked or filtered prior to a Kikuchi band detection procedure. These diffraction spots would otherwise hinder accurate band detection and as such, masking or filtering of these diffraction spots leads to a more accurate Kikuchi band detection Step 202 comprises obtaining a first image of a sample, the first image comprising the electron diffraction pattern. The electron diffraction pattern typically includes a transmission Kikuchi diffraction (TKD) pattern and one or more diffractions spots.

For example, step 202 comprises obtaining, from detector 110, the first image comprising the electron diffraction pattern. Therefore, the first image comprises electron patterns formed by electrons transmitted through the electron transparent sample (i.e., transmitted electrons 108).

Figure 3A:
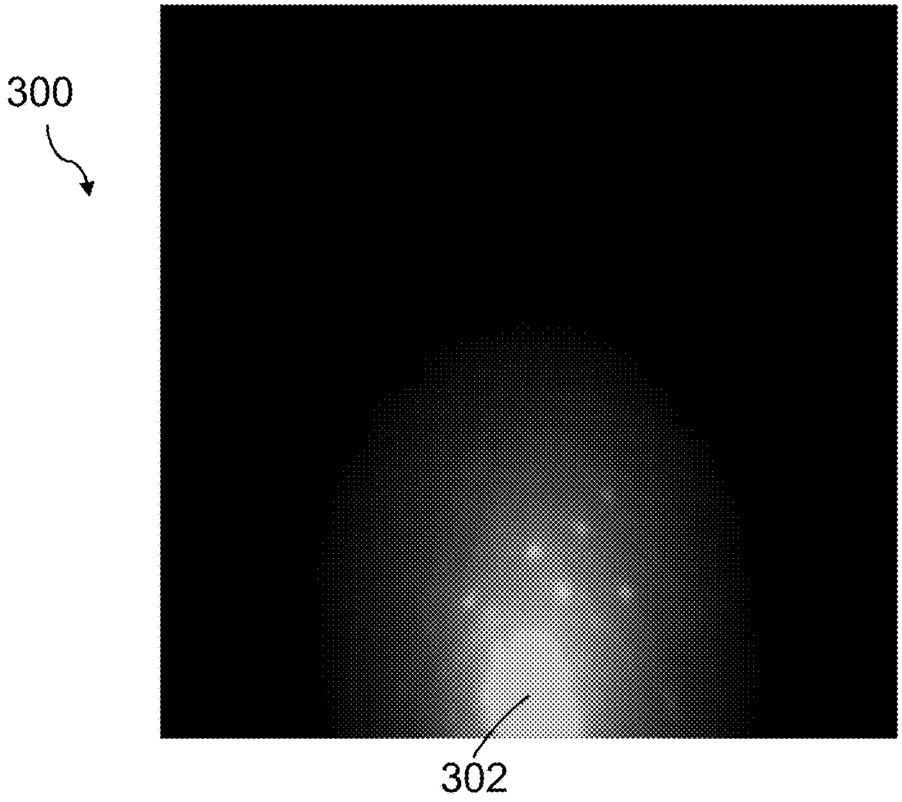
FIG. 3A shows an example image obtained using a detector of the system of FIG. 1A.

FIG. 3A shows an example first image 300 obtained using the detector 110. The pattern 100 comprises a saturated region 302 corresponding to transmitted electrons 108 that have passed through the electron transparent sample with minimal interaction with the sample and are incident on a portion of the screen of the detector 110. The intensity in this saturated region 302 is such that pixels in the saturated region 302 are rapidly saturated and the pixel outputs are less useful for further analysis.

Figure 3B:
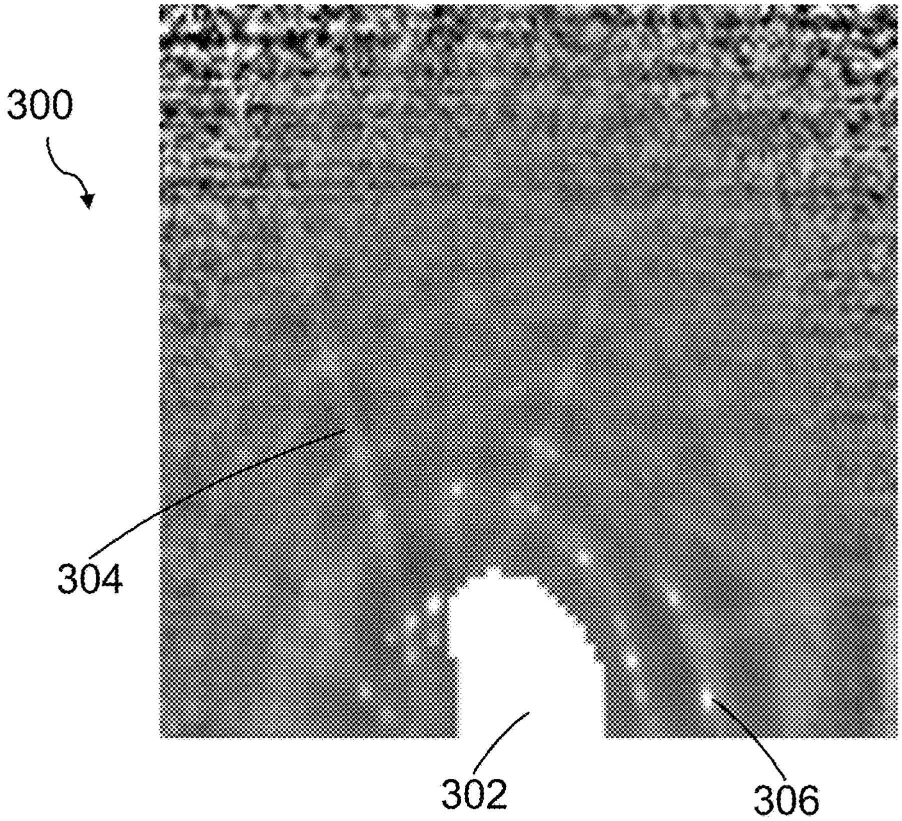
FIG. 3B shows a further example image obtained using a detector of the system of FIG. 1A.

FIG. 3B shows a further example image 300 obtained using detector 110. The further example image of FIG. 3B is not the same electron diffraction pattern as the first image of FIG. 3A. In the example first image 300 of FIG. 3B, the contrast has been modified in comparison to the first image 300 of FIG. 3A to maximize the contrast of the diffraction features (i.e., the Kikuchi bands and the diffractions spots). The first image 300 comprises the saturated region 302, Kikuchi bands 304, and diffraction spots 306. The Kikuchi bands 304 are narrow, bright bands that can be used by TKD analysis software to determine information about the crystal structure of the sample. The diffraction spots 306 are small, round, bright spots surrounding the saturated region 302. The diffraction spots 306 are an electron diffraction phenomenon and are formed by a different mechanism to the Kikuchi bands, whilst also providing some information on the crystal structure of the sample. Specifically, the diffraction spots are formed when the incident angle of a primary electron beam aligns with a crystal plane of the sample. As the beam scans over regions of different crystal orientation in the sample, different diffraction spots are observed, with varying intensity.

There is a variation in the electron signal level detected across the first image 300. Around the saturated region 302, the electron signal is significantly greater than pixels located away from the saturated region 302. The electron signal reduces rapidly away from the saturated region. This broad electron signal distribution across the first image 300, neglecting the Kikuchi bands 304 and the diffraction spots 306 is herein described as the "background signal intensity distribution" of the first image 300.

Step 204 of the method comprises: obtaining a second image representing a background signal intensity distribution of the first image. As discussed above, the background signal intensity distribution refers to the pixel's intensity distribution caused by background signals. These background signals correspond to electrons captured by the detector which are a result of the electrons transmitted through the sample but don't generate diffraction effects or patterns. In other words, these background signals are signals that aren't associated with Kikuchi bands and diffraction spots. For example, an electron of the SEM electron beam 104 that scatters inelastically, typically by interacting with electrons in the material rather than the atomic nuclei, produces no diffraction pattern and is thus part of the background signal. The background distribution is primarily a result of well-understood scattering probabilities wherein it is more likely that an electron is scattered through a small angle than a large one. Thus, more electrons are scattered around the beam axis (small angle), than are scattered far away from it (large angle), thus producing the saturated region 302.

In an example implementation, obtaining the second image comprises: filtering the first image to remove features having a spatial frequency exceeding a threshold spatial frequency. The threshold spatial frequency is set such that the removed features are high-spatial-frequency features that have an abrupt change in intensity over a short distance (i.e., Kikuchi band features and diffraction spot features). By contrast, the background signal intensity distribution has a low spatial frequency because the intensity changes gradually across pixels and as such, the background signal features will not be removed from the first image. The threshold spatial frequency can be pre-defined. Alternatively, the threshold spatial frequency can be determined on an image-by-image basis, for example by selecting a frequency based on the mean frequency.

Filtering the first image can be achieved in a variety of ways including, but not limited to applying a Savitzky-Golay filter; or applying a fast Fourier transform (FFT) filter. For example, applying the FFT filter converts the first image from the spatial domain to the frequency domain. In the frequency domain, high-spatial-frequency components are represented by high frequency spikes. A mask can be applied to exclude features that have spatial frequencies above the threshold special frequency.

Figure 4:
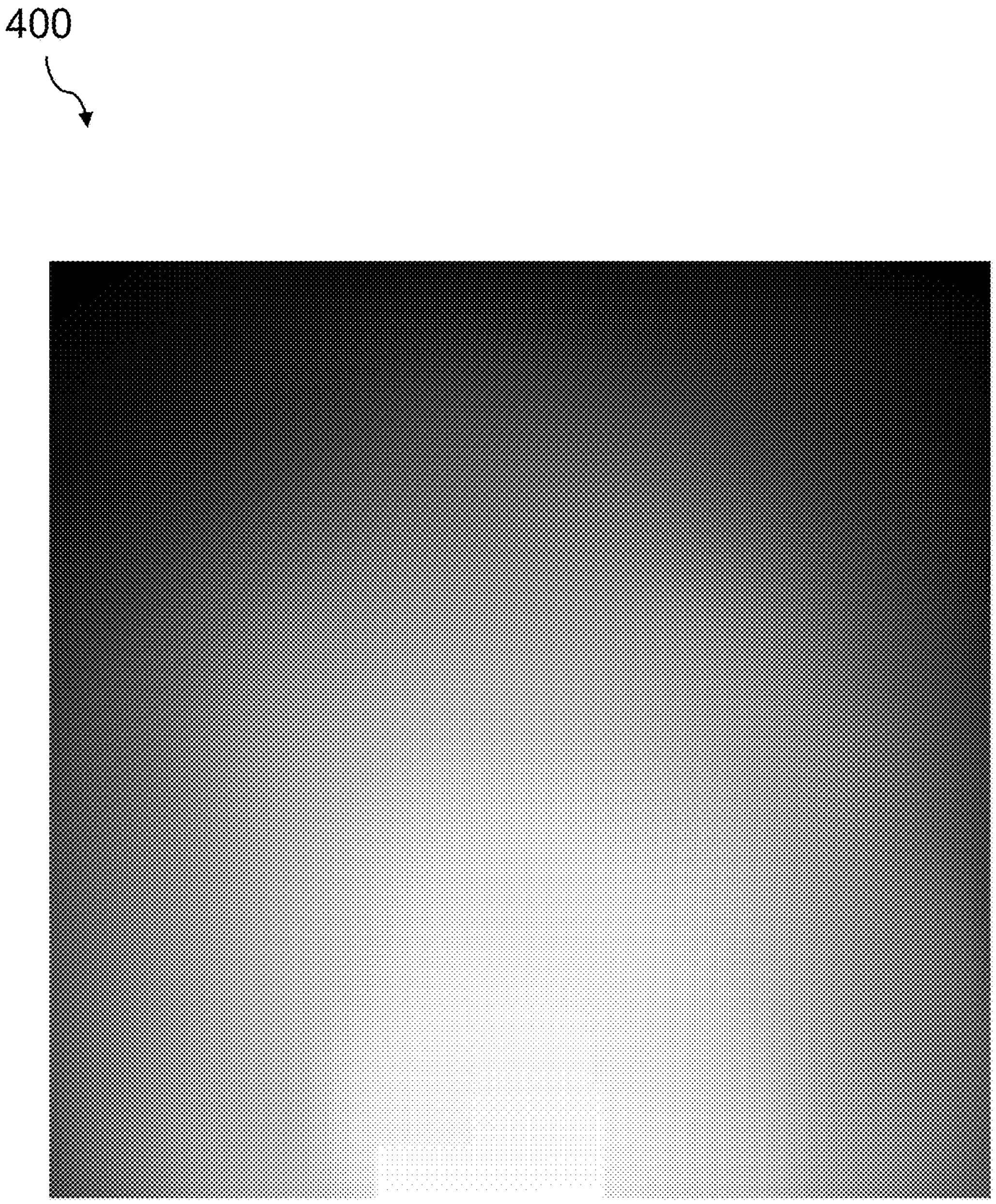
FIG. 4 shows an example image of a background signal intensity distribution.

FIG. 4 shows an example background signal intensity distribution 400 (i.e., second image 400) obtained by passing the first image 300 though a 2-dimensional Savitzky-Golay filter to remove high-frequency features or structures, such as Kikuchi bands and/or diffraction spots. As illustrated by FIG. 4, the second image 400 clearly shows a smooth intensity distribution, wherein pixel intensity gradually varies across pixels.

Obtaining the second image in this manner can be preferable because any first image can be processed with no additional data requirement. However, obtaining the second image in this manner may be computationally intensive if a plurality of first images are processed.

In an alternative implementation, obtaining the second image comprises: scanning an electron beam over an area of the sample comprising features with a threshold number of different crystal orientations; obtaining, from the detector whilst scanning the electron beam, a plurality of images of the area of the sample; and obtaining an average image from the plurality of images. The threshold number of different orientations is selected such that diffraction features are produced from features with different orientations. Averaging the plurality of images produces a final background image within which no diffraction pattern from any single feature (e.g., crystal grain) is observed and only a broad background intensity distribution remains. The features that change over time (i.e., as the beam is scanning the sample) are the TKD patterns and the diffraction spots, because these are based on the crystal orientation of the sample features. The average image therefore captures the background signal intensity distribution, because this is typically not dependent on the crystal orientation of the sample features.

In a further alternative implementation, obtaining the second image comprises: obtaining, from the detector, a background image from a portion of the sample that does not generate an electron diffraction pattern. In other words, this alternative implementation involves obtaining an image, from the detector 110, from a portion of the sample that does not produce any TKD patterns or diffraction spots. This background image may be used as the second image for all first images of the sample and therefore the first image may not require any processing to obtain the second image.

However, in some samples, there may be no region that does not generate an electron diffraction pattern.

In a further alternative implementation, obtaining the second image comprises: destroying the crystal structure of the sample in a localized portion; and obtaining, from the detector, an image of the localized portion. Destroying the crystal structure could be achieved by irradiating the localized portion of the sample with an electron beam for a period (e.g., several minutes) long enough to destroy the crystal structure. Since the crystal structure at the localized portion is destroyed, the contrast of diffraction features in patterns collected from the localized portion following irradiation will be reduced substantially to zero, and only the broad background distribution will remain.

Step 206 comprises defining, for the second image, a plurality of second pixel sets by assigning one or more pixels of the second image to a respective second pixel set based on a pixel value of the pixel, wherein each second pixel set spans a respective pixel value range.

For example, to define the plurality of second pixel sets, each pixel of the second image is assigned to one or more second pixel sets such that each second pixel set comprises pixels with pixel intensities within a threshold intensity of the other pixels in the second pixel set.

Each second pixel set (or pixel group) is defined such that each pixel within the second pixel set has equal or similar intensity to the other pixels within the second pixel set, because each pixel in a particular second pixel set is within a threshold intensity of the other pixels in that second pixel set. Each second pixel set can be defined such that it spans a particular intensity range, and pixels with an intensity value within the intensity range of a second pixel set are assigned to that second pixel set. Second pixel sets can have intersecting intensity ranges, such that one pixel can be assigned to more than one second pixel set. In some implementations, each second pixel set could be limited to a maximum number of pixels (e.g., 100 pixels).

For example, Table 1 shows a table of pixel locations in the second image 400 against pixel grey levels (or intensity values) of those pixel locations.

TABLE 1

| Pixel location (x, y) | Pixel grey level |
|---|---|
| $(x_1, y_1)$ | $G_1$ |
| $(x_2, y_2)$ | $G_2$ |
| $(x_3, y_3)$ | $G_3$ |
| $(x_4, y_4)$ | $G_4$ |
| . . . | . . . |

The rows in Table 1 can be sorted by the values in the 'Pixel grey level' column, such that the pixel locations are sorted according to the pixel intensity values. Following this sort operation, the 'Pixel location' column is now a list of pixels in the second image 400 sorted by their filtered electron signal intensity. It will be understood that this column is also a list of pixels in the first image 300, sorted by 'background' electron signal intensity, prior to additional Kikuchi band or diffraction spot contrast being superimposed on to this background by electron diffraction effects in the sample.

This sorted pixel location list is then used as the basis to form the plurality of second pixel sets. Second pixel sets can be obtained by selecting contiguous sets of pixels based on the sorted pixel intensity values. More particularly, contiguous sets of entries in the sorted pixel location list. For example, each second pixel set may contain 100 pixel locations (or another predefined number of pixel locations). Each pixel location (i.e., pixel) in the TKD image typically belongs to at least one second pixel set; and a pixel location may belong to multiple second pixel sets (sections of the sorted pixel location list used to define second pixel sets may overlap). Each second pixel set then represents a set of pixel locations subject to equal or similar background electron intensity. For a TKD pattern with typical background intensity distribution, the set of pixel locations defined by a second pixel set tends to be distributed across the pattern image in ring-type structures such as those displayed in white pixels in FIG. 5.

Figure 5:
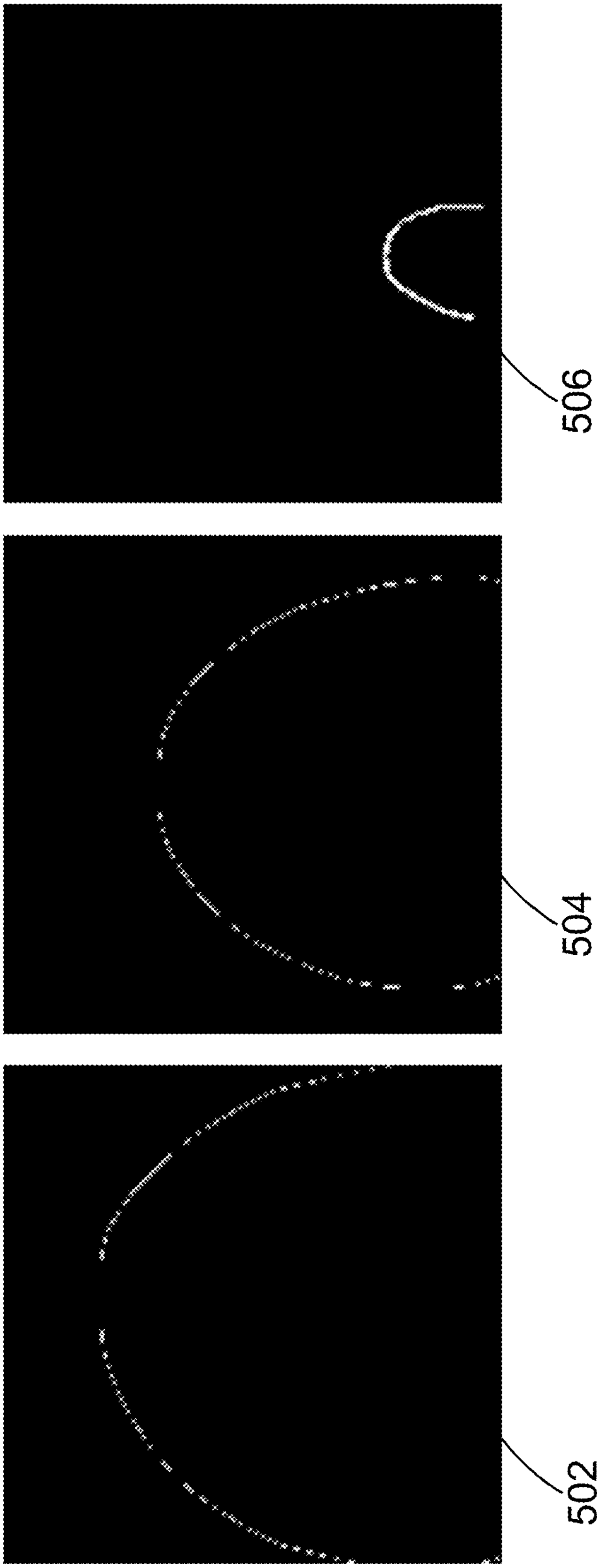
FIG. 5 shows example pixel sets of the image of the background intensity distribution.

FIG. 5 shows example second pixel sets 502, 504, 506 of the second image 400 shown in FIG. 4. Each second pixel set 502, 504, 506 comprises a plurality of pixels having the same or similar intensity values. Since the second image 400 is a smooth intensity distribution, the second pixel sets of FIG. 5 effectively describe contours of pixels with a similar intensity in the second image 400. Thus, the second pixel sets approximate contours of constant (or near-constant) intensity. It will be appreciated that FIG. 5 only shows three second pixel sets 502, 504, 506, and that all pixels of the second image are assigned to one or more second pixel sets 502, 504, 506 so many more second pixel sets would be determined.

Step 208 comprises: identifying, using first pixel sets in the first image corresponding to respective second pixel sets, any outlier pixels as being pixels associated with diffractions spots. It will be appreciated that in some cases, no outlier pixels are identified (e.g., if no diffraction spots were produced).

Identifying, using the first pixel sets in the first image corresponding to the second pixel sets, any outlier pixels in the first image comprises: identifying, from pixels of a first pixel set, any pixels that meet a threshold condition of that first pixel set. Every pixel of the second image 400 corresponds to a respective pixel of the first image 300. Thus, each second pixel set identified in step 206 has a corresponding first pixel set in the first image 300. The pixels in the first image 300 corresponding to the pixels in the first pixel set are pixels that have the same pixel location as the pixels of a corresponding second pixel set (in the second image 400).

In some implementations, identifying, from pixels of the first pixel set, any pixels that meet a threshold condition of that first pixel set comprises: obtaining a mean pixel intensity of the first pixel set; obtaining a pixel intensity standard deviation of the first pixel set; and identifying any pixels of the first pixel set having a pixel intensity greater than a threshold factor of pixel intensity standard deviations from (e.g., above) the mean pixel intensity.

For example, taking second pixel set 502 as an example, a mean pixel intensity $\mu_c$, and standard deviation pixel intensity, $\sigma_c$ are obtained using pixel intensity values from the pixels present in a first pixel set corresponding to the second pixel set 502. Pixels that meet the threshold condition are pixels that satisfy the equation (1):

$$T_c \geq \mu_c + (T_\sigma \cdot \sigma_c)$$

Wherein $T_c$ is the pixel intensity value of a particular pixel in the first image, $\mu_c$ is the mean pixel intensity of the first pixel set of the first image, $\sigma_c$ is the standard deviation pixel intensity of the first pixel set of the first image, and $T_\sigma$ is the threshold factor.

The threshold factor $T_σ$ is a pre-defined threshold factor. The threshold factor $T_σ$ is chosen such that pixels associated with diffraction spots satisfy the equation (1), but other pixels, such as pixels associated with Kikuchi band features, do not satisfy the equation (1). The threshold factor $T_σ$ is typically in the range of 2 to 5.

Therefore, pixels that satisfy the above equation (1) are pixels of the first image 300 that have pixel intensity values at least 2 to 5 standard deviations greater than the mean pixel intensity.

Excluding detector effects, it is expected that pixel intensity values display a Poisson noise distribution. The standard deviation of a Poisson noise distribution within a pixel is a function of the expected (i.e., the mean) number of electrons incident on that detector pixel during an exposure. Therefore, it is expected that pixels subject to different background intensity levels to demonstrate different Poisson noise levels.

As discussed above, TKD patterns can demonstrate extreme changes in electron intensity across the pattern. Applying equation (1) as a condition to consistently detect diffraction spots across a whole TKD pattern therefore only produces consistent results if sets of pixels having similar incident electron intensity and therefore comparable Poisson noise distributions are used. By working with sets, pixels associated with diffraction spots can be approximated as having pixel intensity values T times the Poisson noise level above the mean intensity value of that first pixel set.

In a simplified model, three factors affect a pixel value, and so ultimately the standard deviation that can be measured from a cluster. These factors include background level; diffraction contrast (i.e., including Kikuchi bands and diffractions spots); and Poisson noise. In the present invention, within a particular second pixel set, the background level in every pixel is similar in value, so background level variation doesn't contribute significantly to the standard deviation within that particular second pixel set. The standard deviation attributable to Kikuchi band contrast is typically constant across all clusters because Kikuchi band contrast is typically the same everywhere. Poisson noise is the main reason why standard deviation might change from pixel set to pixel set. Poisson noise within a single pixel is proportional to the square root of the pixel intensity value in that pixel. Signal level is primarily defined by background level, so a first order assumption is that the contribution to standard deviation from Poisson noise is proportional to the square root of the background signal intensity. Thus, by assigning pixels to second pixel sets such that all pixels within a particular second pixel set have broadly the same background level, it is expected that all pixels within the second pixel set will have very similar Poisson noise levels too. Therefore, by defining second pixel sets with roughly the same background level, all pixels of the first pixel sets should show roughly comparable noise levels individually and behave fairly predictably collectively. Accordingly, a constant threshold factor can be defined across the whole image. Within a first pixel set, the outlier level is related to T*the Poisson noise level within that first pixel set.

Pixels representing diffraction spots are typically significantly brighter than those present in TKD patterns. Setting the threshold factor as a value in the range 2-5 is typically sufficient to identify pixels associated with diffraction spots with minimal "false negatives" of pixels associated with TKD patterns. Regardless, even if a few false positives are detected, TKD patterns are large features comprising a significant number of pixels and as such, masking or modifying such false positives will not significantly affect the detectability of the TKD pattern.

In some implementations, the method 200 further comprises the iterative steps: modifying the outlier pixels from the first image; and identifying, from the first pixel sets, any further pixels that meet a threshold condition of that first pixel set. In other words, the method further comprises removing the outlier pixels associated with the diffraction spots and repeating the step of identifying pixels in the first image corresponding to the pixels in a first pixel sets that meet the threshold condition of that first pixel set. Removing the initially identified outlier pixels leads to the mean pixel intensity and the standard deviation pixel intensity changing (i.e., reduce) because these removed pixels no longer contribute to the either value. Therefore, repeating the step of identifying pixels in the first image corresponding to the pixels in a first pixel set that meet the threshold condition of that first pixel set can result in additional outlier pixels being identified. This can be repeated until a stop condition is met. The stop condition could be a threshold number of iterations or could be a point at which no more outlier pixels are found.

In an optional step, the method 200 further comprises: removing the diffraction spots from the first image. The person skilled in the art would know of several ways to remove, mask, or substitute (e.g., using surrounding pixel values) the diffraction spots from the first image. For example, a binary mask may be applied, wherein pixels of a particular intensity are set to 0 (i.e., so that these pixels have 0 intensity). The intensity values for pixels to be set to 0 would be pixels associated with the diffraction spots. In this way, a masked first image is produced comprising an electron diffraction pattern including a TKD pattern but excluding diffraction spots.

In an optional step, the method 200 further comprises: indexing each diffraction spot; and performing crystal structure analysis using at least the diffraction spots.

The invention claimed is:

1. A method for detecting diffraction spots in an electron diffraction pattern obtained from a sample, the method comprising the steps:
- obtaining a first image of the sample, the first image comprising the electron diffraction pattern;
- obtaining a second image representing a background signal intensity distribution of the first image;
- defining, for the second image, a plurality of second pixel sets by assigning one or more pixels of the second image to a respective second pixel set based on a pixel value of the pixel, wherein each second pixel set spans a respective pixel value range; and
- identifying, using first pixel sets in the first image corresponding to respective second pixel sets, any outlier pixels in the first image as being pixels associated with diffraction spots.

2. The method of claim 1, wherein identifying, using the first pixel sets in the first image corresponding to the second pixel sets, any outlier pixels in the first image comprises:
- identifying, from pixels of a first pixel set, any pixels that meet a threshold condition of that first pixel set.

3. The method of claim 2, wherein identifying, from pixels of the first pixel set, any pixels that meet a threshold condition of that first pixel set comprises:
- obtaining a mean pixel intensity of the first pixel set;
- obtaining a pixel intensity standard deviation of the first pixel set; and
- identifying any pixels of the first pixel set having a pixel intensity greater than a threshold factor of pixel intensity standard deviations from the mean pixel intensity.

4. The method of claim 3, wherein the threshold factor of pixel intensity standard deviations from the mean pixel intensity is in the range of 2 to 5.

5. The method of claim 2, wherein the method further comprises the iterative steps:

modifying the outlier pixels from the first image; and identifying, from the first pixel sets, any further pixels that meet a threshold condition of that first pixel set.

6. The method of claim 1, wherein pixel locations of the pixels in a first pixel set are the same, or correspond to, pixel locations of corresponding pixels in the second pixel set.

7. The method of claim 1, wherein modifying the outlier pixels from the first image comprises:

removing the pixel or adjusting the pixel value of the outlier pixels.

8. The method of claim 1, wherein obtaining, from the second image, the plurality of second pixel sets comprises:

grouping the pixels of the second image based on their pixel intensity values.

9. The method of claim 8, wherein grouping the pixels of the second image based on their pixel intensity values comprises:

obtaining pixel intensity values of the pixels in the second image;

sorting the pixels according to the pixel intensity values; and selecting contiguous sets of pixels based on the sorted pixel intensity values.

10. The method of claim 1, wherein obtaining, from the second image, the plurality of second pixel sets comprises:

assigning each pixel of the second image to one or more second pixels sets such that each second pixel set comprises pixels with pixel intensities within bounding values defining the second pixel set.

11. The method of claim 1, wherein obtaining the second image comprises:

filtering the first image to modify features having a spatial frequency exceeding a threshold spatial frequency.

12. The method of claim 11, wherein modifying the features comprises smoothing or removing the features.

13. The method of claim 11, wherein filtering the first image comprises:

applying a Savitzky-Golay filter; or applying a fast Fourier transform, FFT, filter.

14. The method of claim 1, wherein obtaining the second image comprises:

scanning an electron beam over an area of the sample comprising features with a number of different crystal orientations greater than or equal to a predefined minimum;

obtaining, from the detector whilst scanning the electron beam, a plurality of images of the area of the sample; and obtaining an average image from the plurality of images.

15. The method of claim 1, wherein obtaining the second image comprises:

obtaining a background image from a portion of a calibration sample that does not generate an electron diffraction pattern.

16. The method of claim 15, wherein the calibration sample is a portion of the sample.

17. The method of claim 1, wherein obtaining the second image comprises:

modifying the crystal structure of the sample in a portion of the sample; and obtaining, from the detector, an image of the portion.

18. A system for detecting diffraction spots in an electron diffraction pattern obtained from an electron-transparent sample, the system comprising:

a computer system including a central processing unit having a primary memory, wherein the system is configured when in use to perform the method according to claim 1.

19. The system of claim 18, further comprising:

a detector configured to:

receive electrons transmitted through the electron-transparent sample as a result of an electron beam interacting with the sample; and generate data representing the transmitted electrons for analysis.

20. A computer program product comprising instructions which, when the program is executed by a computer, causes the computer to carry out the method of claim 1.

* * * * *